United States Patent [19]

Takeuchi

[11] 3,803,727
[45] Apr. 16, 1974

[54] VEHICLE DRYING APPARATUS
[75] Inventor: Shigeo Takeuchi, Nagoya, Japan
[73] Assignee: Takeuchi Tekko Kabushiki Kaisha, Nagoya-shi, Aichi-ken, Japan
[22] Filed: Feb. 1, 1973
[21] Appl. No.: 328,660

[30] Foreign Application Priority Data
May 30, 1972 Japan.............................. 47-52927

[52] U.S. Cl. ................................................. 34/229
[51] Int. Cl. ............................................ F26b 19/00
[58] Field of Search ............ 34/233, 229, 222, 232, 34/227, 225, DIG. 13; 15/DIG. 2, DIG. 7, 405

[56] References Cited
UNITED STATES PATENTS
3,279,093 10/1966 Dutton................................. 34/229
3,085,351 4/1963 Hurst................................... 34/229
3,442,027 5/1969 Hurwitz............................... 34/229
3,224,108 12/1965 Flaming............................... 34/229

Primary Examiner—John J. Camby
Assistant Examiner—James C. Yeung
Attorney, Agent, or Firm—Eric H. Waters

[57] ABSTRACT

A vehicle drying apparatus of the type through which a vehicle to be dried progresses and provided with air nozzle means adapted not only to be moved vertically in accordance with the dimensions of the vehicle but also to keep the air blasts at all times substantially normal to the contour of the vehicle and air conducting means of rigid construction arranged between said air nozzle means and a source of compressed air.

5 Claims, 7 Drawing Figures

3,803,727

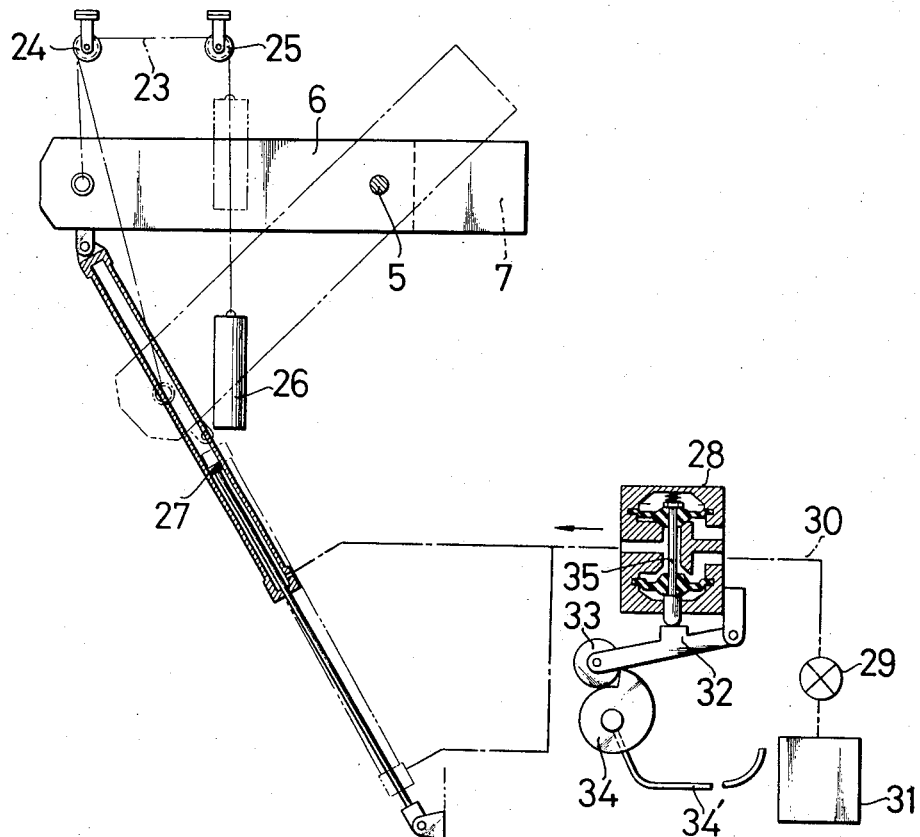
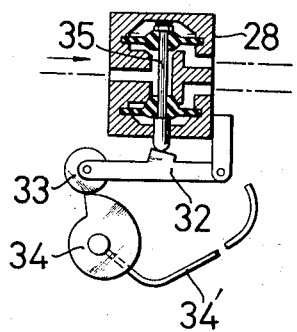

1

VEHICLE DRYING APPARATUS

BACKGROUND OF THE INVENTION

The present invention relates to vehicle drying apparatus of the type through which a vehicle to be dried progresses and more particularly to those forming part of a vehicle cleaning equipment and usable to dry an automobile or other vehicle just after it has been washed.

A vehicle drying apparatus of the type described is known which employs nozzle means for blowing compressed air against the exterior surfaces of a vehicle to be dried. Previously, however, the nozzle arrangement in such apparatus has lacked any positive means for changing the nozzle direction, the nozzle assembly being connected with a source of compressed air supply through the intermediary of an extensible flexible duct that allows variation in distance between the air supply source and the nozzle assembly. It has thus been practically impossible to keep the air blasts suitably directed relative to the contoured surface of the vehicle throughout the drying cycle and only an unsatisfactory drying efficiency has been obtainable.

Additionally, the previous drying apparatus has been disadvantageous in that the air supply duct, principally of the form of corrugated bellows-like tube, not only presents substantial resistance to the flow of compressed air but also is liable to wear and break under the effect of repeated extension and contraction or bending.

SUMMARY OF THE INVENTION

Under these circumstances, the present invention is intended to provide a novel vehicle drying apparatus of the character described which can dry a vehicle in a particularly rapid and effective manner. One specific object of the invention is to provide nozzle control means for keeping the nozzle orifices directed substantially normal to the exterior surfaces of the vehicle throughout the drying cycle of the apparatus. Another object of the invention is to enable supply of compressed air to the nozzle assembly while avoiding use of any flexible air conducting means.

BRIEF DESCRIPTION OF THE DRAWINGS

The present invention will next be described in detail with reference to the accompanying drawings, which illustrate one preferred embodiment of the invention and in which:

FIG. 5 is a partly schematic vertical cross-sectional view, on an enlarged scale, of the pneumatic nozzle acutator device shown in FIG. 2, showing the device in its normal raised position together with a switching valve positioned to energize the same; and FIG. 6 is a vertical cross-sectional view of the switching valve, showing the same pisitioned to de-energize the nozzle actuator device.

DESCRIPTION OF THE PREFERRED EMBODIMENT

Figure 1:
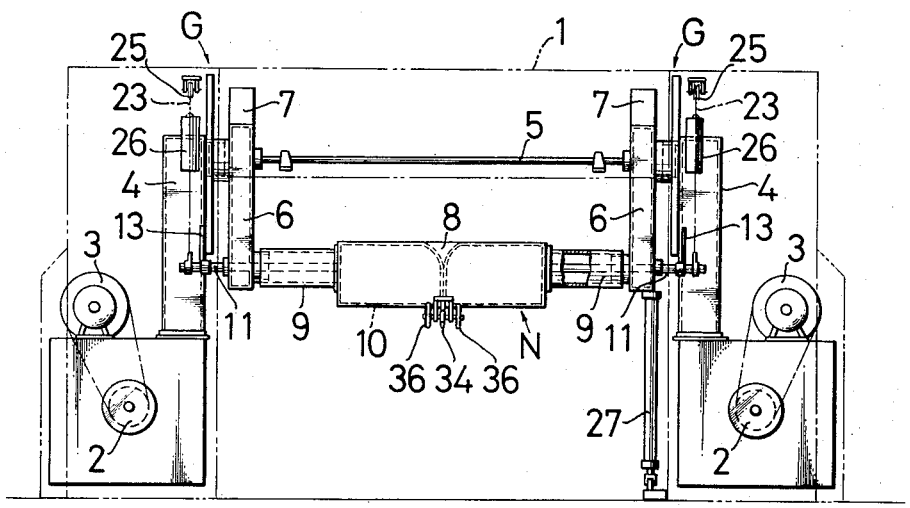
FIG. 1 is a partly schematic front elevational view of a vehicle drying apparatus embodying the present invention.
Figure 2:
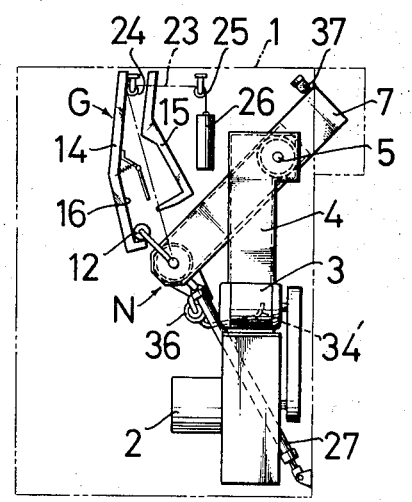
FIG. 2 is a side elevational view of same.

Referring to the drawings and first to FIGS. 1 and 2, reference numeral 1 indicates a portal frame structure through which a vehicle to be dried progresses and which includes right and left side columns, on which are arranged a pair of blowers 2—2 operable under the drive of respective motors 3—3 and a pair of upright air ducts 4—4 of rigid construction connected at the bottom to the outlets of respective blowers 2—2. Mounted horizontally on the overhead portion of the frame 1 is a support shaft 5 on which a pair of rocker arms 6—6 are mounted at respective locations adjacent to the opposite ends of the shaft 5 for rocking movement in respective vertical planes extending parallel to the longitudinal axis of the frame, along which the vehicle being dried progresses. The rocker arms 6—6 are each made hollow, forming an air passage connected with the adjacent upright air duct 4 through a fluid conducting swivel joint, for example, comprised of a tubular outlet formed on the top portion of the air duct 4 and a tubular inlet formed on the rocker arm 6 on its axis of rotation and rotatably fitted in said outlet in fluid sealing relation therewith, as observed in FIGS. 1 and 2. Further, weights 7—7 are carried by respective rocker arms 6—6 at the base ends thereof in a manner so as to bias the rocker arms upwardly or in a clockwise direction as viewed in FIG. 2 and 5 under gravity.

A nozzle assembly, designated generally by reference character N is rotatably supported between the pair of rocker arms 6—6 at the lower end thereof and is constructed as will be described below.

The nozzle assembly includes a nozzle body or structure 8 which is generally drop-shaped in vertical cross section and formed at the bottom with an orifice in the form of an elongated slit. Formed integrally with the nozzle structure 8 are a pair of aligned end shafts 11—11 which extend horizontally outwardly from the opposite ends of the nozzle body 8 and are journaled in the respective rocker arms 6—6 at the lower ends thereof. Encircling the respective end shafts 11—11 are a pair of aligned air conduits 9—9 which are formed integral with the nozzle body 8 and open at one end therein. The tubular conduits 9—9 are each connected at the other end with the adjacent one of rocker arms 6—6 by means of a fluid conducting swivel joint of the type described hereinbefore. With such arrangement, it will be readily observed that in operation compressed air from said blowers 3—3 is directed through the air ducts 4—4 and rocker arms 6—6 into the nozzle body 8 at the opposite ends thereof and hence is blown out through its orifice 10.

Description will next be made of an arrangement designed to control the nozzle direction in accordance with the vertical displacement of the nozzle assembly N as carried by the rocker arms 6—6.

As shown in FIG. 1, lever arms 13—13 are fixed to the outer ends of the respective shafts 11—11 of the nozzle assembly N and weights 12—12 (FIG. 2) are secured to the respective ends of lever arms 13—13. In order to define paths for respective weights 12—12, guide means G—G are arranged on the inside of the frame 1 and, together with the weighted arms 13—13, form a nozzle direction controlling device which is operable to turn the nozzle assembly N about its axis in a predetermined fashion as the assembly N is vertically displaced with motion of rocker arms 6—6.

Figure 3:
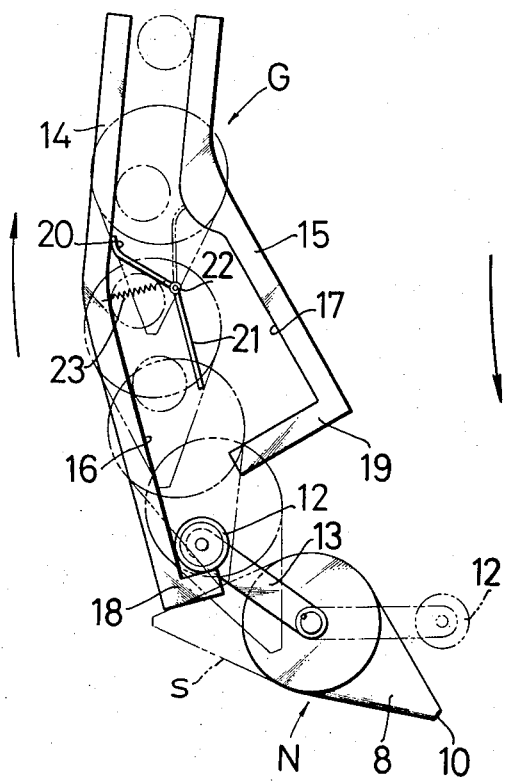
FIG. 3 is a detached side elevational view, on an enlarged scale, of the nozzle controlling device in the embodiment shown in FIGS. 1 and 2, illustrating the manner in which the nozzle assembly is guided when it is raised.
Figure 4:
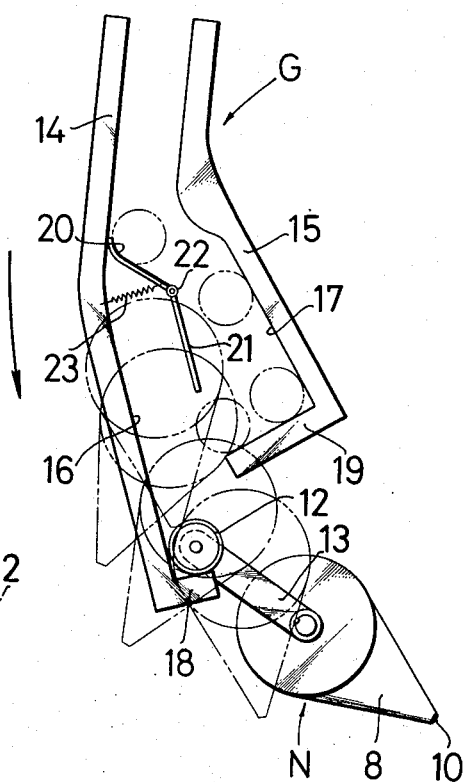
FIG. 4 is a view similar to FIG. 3, illustrating the manner in which the nozzle assembly is guided when it is lowered.

As shown clearly in FIGS. 3 and 4, each of the guide means G—G includes a front and a rear guide member 14 and 15 defining on the inside respective guide surfaces 16 and 17 and formed at the bottom with hooked extensions 18 and 19, respectively. Fixed in the space between the two guide members 14 and 15 is a guide plate 21 to the top end of which a switching plate or flap 20 is pivotally secured with a coiled tension spring 23 arranged between the flap 20 and front guide member 14 to bias the flap 20 leftward as viewed in FIG. 3 or 4. The weights 12—12 formed integral with the nozzle body 8 are each held selectively in engagement with either of the guide surfaces 16 and 17 under the effect of its own gravity and with the aid of switching plate 20, as will be described hereinafter in more detail.

Referring again to FIGS. 1 and 2, numeral 23 indicates cables secured at one end to the respective end shafts 11 of the nozzle assembly N and each supported by pulleys 24 and 25 mounted on the frame 1. Reference numeral 26 indicates weights secured to the respective cables 23 at the other end thereof. It will be apparent that such weighted cable arrangement serves to urge the rocker arms 6—6 upwardly or in a clockwise direction, as viewed in FIG. 2, in cooperation with the weights 7—7 carried by the rocker arms.

Description will next be made of means provided for actuating the rocker arms against the biasing effects of weights 7—7 and 26—26.

In the embodiment shown, the actuator means include a pneumatic actuator 27 which is associated with one of the rocker arms 6—6 and, as shown in FIG. 5, is comprised of a cylinder member pivotally secured to the end of the rocker arm 6 and a piston rod member pivotally secured to the frame 1. When energized with compressed air fed in the lower working chamber of the cylinder member, the actuator 27 acts to draw the associated rocker arm 6 and hence the nozzle assembly N together with the other rocker arm 6 downwardly against the gravity action of the weights 7—7 and 26—26. It will be understood that the actuator means form together with the biasing weights 7—7 and 26—26 an effective means for raising and lowering the nozzle assembly N through the intermediary of the rocker arms 6—6.

As clearly shown in FIG. 5, the lower chamber or working space in the pneumatic actuator 27 is connected to a compressed air reservoir 31 by way of a conduit 30, which includes a switching valve 28 and a gate valve 29. The switching valve 28 is intended selectively to direct compressed air from reservoir 31 into the lower chamber of air cylinder or acturtor 27 or to allow the compressed air to be discharged to the atmosphere.

An operating lever 32 is pivotally secured to the bottom of switching valve 28 and carries a cam follower roller 33, which is held in engagement with a cam member 34 rotatably mounted on the nozzle body 8 (see also FIG. 2). A feeler lever 34' is secured to the cam member 34 for contacting engagement with the external surfaces of the vehicle being dried. The cam member 34 is normally held in the position shown in FIG. 5, abutting against an appropriate stop, not shown, under the gravity of feeler lever 34'.

The valve stem 35 of switching valve 28 is in abutting engagement with the operating lever 32 intermediate the ends thereof so as to be axially displaced as the lever 32 is vertically moved for switching operation of the valve 28. That is to say, when the valve stem 35 is in its lower position shown in FIG. 5, the lower chamber in the actuator 27 is in fluid communication with the pressure reservoir 31 and, when valve stem 35 is raised to its upper position, as shown in FIG. 6, the actuator chamber is exhausted to the atmosphere.

Incidentally, reference numeral 36 (FIGS. 1 and 2) indicates a pair of rubberized or other rollers made of soft material rotatably mounted on the underside of the nozzle body 8 axially centrally thereof for rolling contact with the surface of the vehicle being dried and thus serving the purpose of maintaining a substantially definite distance between the nozzle body 8 and the surface of the vehicle. Reference numeral 37 (FIG. 2) indicates stop means provided to limit downward rocking movement of the rocker arms 6—6.

Description will now be made of the operation of the vehicle drying apparatus. As will be readily understood, when the pneumatic actuator 27 is in de-energized state, the rocker arms 6—6 are held in their topmost position under the gravity of weights 7—7 and 26—26, as shown in FIG. 5 by solid lines.

Now, when the gate valve 29 is opened, compressed air is fed from reservoir 31 into the lower chamber of the pneumatic actuator 27 through the intermediary of switching valve 28, and the actuator 27 is contracted to rotate the rocker arm 6—6 downwardly or in a counterclockwise direction as viewed in FIGS. 2 and 5 against the gravitational effect of weights 7—7 and 26—26 so as to place the nozzle body 8 in its lowermost position indecated in FIG. 2 by the solid lines. It is to be understood that this position is predetermined at a height appropriate to the purpose of drying the front side of the vehicle.

Figure 7:
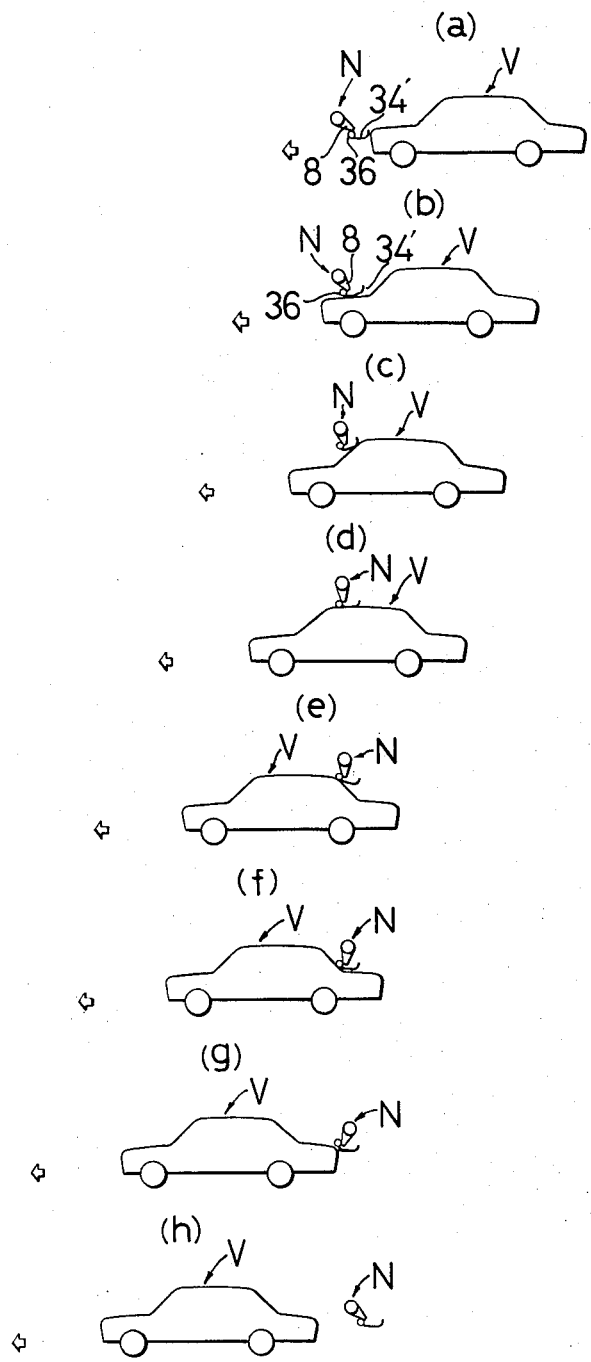
FIG. 7a to h diagrammatical view are showing progressive position of a vehicle in relation to the drying apparatus for drying the vehicle surface after having been washed.

Referring next to FIG. 7, reference character V indicates a vehicle which has just been washed and is now progressing through the portal frame 1 of the vehicle drying apparatus of the invention.

First, when vehicle V gets into the frame 1, the feeler lever 34' comes into contact with the front side of the vehicle (FIG. 7a) to rotate the cam member 34 counter-clockwise, which in turn raises operating lever 32 to push up the valve stem 35 so that the lower chamber of the pneumatic actuator 27 is brought into communication with the atmosphere through the intermediary of the switching valve 28 so operated. It will be readily understood that, as long as the feeler lever 34' is kept in contact with the surface of the vehicle, the lower chamber of actuator 27 is held exhausted allowing the nozzle assembly N to rise continuously under the gravity of weights 7—7 and 26—26. Subsequently, as feeler lever 34' is released from the surface of the vehicle, it begins to fall under gravity causing cam member 34 to turn clockwise and thus the switching valve 28 is restored to the initial position shown in FIG. 5. As the result, the actuator 27 is energized to lower the nozzle assembly N until the feeler lever 34 is again brought into contact with the surface of vehicle V and thus the nozzle assembly N is again raised in the manner described above.

It will be noted that as the vehicle progresses the feeler element 34' is repeatedly brought into and out of contacting engagement with the upper surface of the vehicle and the nozzle assembly N is moved vertically along the upper surface of the travelling vehicle while effecting vertical oscillatory motion of very limited stroke or amplitude. As will be readily understood, the nozzle assembly N continues to rise at varying speed while passing over the bonnet, and the windshield of the vehicle until it comes over the roof thereof, as shown in FIGS. 7b and 7c. Subsequently, the nozzle assembly is held substantially stationary along the vehicle roof (FIG. 7d), then starts to descend along the rear window to the top of the trunk room (FIGS. 7e and 7f), and finally reaches the lowermost position as the vehicle gets through the drying apparatus (FIGS. 7g and 7h).

In such controlled vertical movement of the nozzle assembly, the weights 12—12 formed integral with the nozzle body 8 are guided as follows.

Initially, the weights 12 are each in its normal, lowermost position shown in FIG. 3 by the solid lines, leaning against the guide surface 16 of front guide member 14 under gravity of the weight itself, and, starting from this position, it rises along the guide surface 16 keeping contact therewith so that the rising nozzle body 8 is caused to turn clockwise from its initial rightward direction, as shown in FIG. 3 successively in dotted lines, until it is directed vertically downward. On this occasion, the switching plate 20 is temporarily pushed aside against the bias of tension spring 23 by the rising weight 12, as shown in dotted lines.

Subsequently, as the nozzle body 8 starts to descend from its topmost position, the weight 12 descending together therewith is first deviated rightward into engagement with the guide surface 17 of rear guide member 15 by the switching plate 20, now assuming its normal inclined position, thereby to turn the nozzle body 8 further clockwise, as observed in FIG. 4, and thereafter proceeds downward along the guide surface 17 together with the nozzle body 8 now tilted leftwardly downward until it is engaged by the bottom extension 19 of the rear guide member 15. Subsequently, the weight 12 is again brought into engagement with the guide surface 16 of front guide member 14 under the guide of extension 19 and, descending along the guide surface 16, comes to rest on the bottom extension 18 of the front guide member 14. At the same time, the nozzle assembly naturally restores its normal, lowermost position, as shown by the solid lines in FIG. 4.

it is to be noted that the nozzle body 8 descending together with the weights 12—12 is rotated counterclockwise with the guided motion thereof and the nozzle orifice 10 previously tilted forward or leftward as viewed in FIG. 4 is turned into vertical position and further into its initial position tilted rearward.

it will be readily understood that the nozzle body 8 is rotatable about its horizontal axis while being displaced vertically to keep the nozzle orifice 10 directed at all times substantially normal to the surface of the vehicle being dried, as shown in FIG. 7, under control of weights 12—12 being guided for rocking movement around the axis of rotation of the nozzle body 8. Incidentally, the nozzle body 8 can be stored in an inoperative position, as indicated by dotted lines s in FIG. 3, and held therein under the gravity of weights 12—12.

it will be appreciated from the foregoing that according to the present invention there is provided a vehicle drying apparatus of novel construction which includes a nozzle assembly adapted to be automatically displaced vertically in accordance with the dimensions of the vehicle to be dried while directing the nozzle orifice or orifices substantially at right angles successively to the front, top and rear surfaces of the vehicle and is thus capable of drying the vehicle surfaces in an extraordinarily rapid and effective manner.

it will further be appreciated that, in the apparatus of the invention, the rocker arms serve the dual function of rotatably supporting the nozzle assembly and conducting compressed air from respective air ducts 4—4 into the nozzle assembly. In other words, the air ducts 4—4 and rocker arms 6—6 jointly form efficient means of conducting compressed air from its source such as air blowers 2 into the nozzle assembly, eliminating any need of employing extensible and flexible air-conducting means such as those used in previous forms of vehicle drying apparatus. With this arrangement, it will be readily appreciated that compressed air can be supplied to nozzle means with minimized flow so that not only the apparatus can operate with further improved drying efficiency but also can employ blowers of relatively limited capacity. It will be apparent that such air-conducting arrangement, including no flexible components, is highly durable and less susceptible to air leakage than bellows-like flexible hoses previously used and thus can reduce cost of maintenance to a substantial extent.

Though one preferred embodiment of the invention has been shown and described, it will be apparent to those skilled in the art that many changes and modifications may be made therein without departing from the spirit of the invention or from the scope of the appended claims.

What is claimed is:

1. A vehicle drying apparatus comprising a portal frame through which a vehicle to be dried progresses, rocker arm means rockably mounted on said portal frame, a nozzle assembly horizontally journaled on said rocker arm means, air supply means for supplying compressed air to said nozzle assembly, weight means integrally secured to said nozzle assembly, and guide means fixed to said portal frame to define paths for said weight means to trace rising and descending movements thereof in accordance with the rocking movement of said rocker arm means, whereby the direction of compressed air ejection from said nozzle assembly is automatically varied to be at all times substantially perpendicular to the surfaces to be dried throughout the drying operation.

2. An apparatus as defined in claim 1, wherein said rocker arm means include a pair of hollow rocker arms rockably supported on the top portion of the portal frame on the right and left sides thereof for rocking movement in respective vertical planes paralled to the direction of travel of the vehicle to be dried and pivotally connected with said nozzle assembly at the opposite ends thereof for fluid communication therewith and said air supply means include a pair of air ducts of rigid structure arranged on the right and left sides of the portal frame and a pair of air blowers connected at the outlet with said respective air ducts at one end thereof, said hollow rocker arms being each connected on the axis of rotation thereof with the adjacent one of said air ducts at the other end thereof for fluid communication therewith.

3. A vehicle drying apparatus as claimed in claim 1, wherein each of said guide means includes a pair of guide members, said weight means comprising a plurality of weights each of which is moved along said guide members in upward and downward directions, and including a changing member for changing the path of each said weights.

4. A vehicle drying apparatus as claimed in claim 1 wherein said vehicle is free from contact with said weight means during said drying operation.

5. A vehicle drying apparatus as claimed in claim 1 wherein the orifice of said nozzle assembly is directed substantially normal to the surfaces to be dried during the drying operation.

* * * * *